(12) United States Patent
Saxe et al.

(10) Patent No.: US 9,417,471 B2
(45) Date of Patent: Aug. 16, 2016

(54) METHOD AND DEVICE FOR PROTECTING OBJECTS FROM DEGRADATION BY LIGHT WITH SUSPENDED PARTICLE DEVICE LIGHT VALVES

(71) Applicant: Research Frontiers Incorporated, Woodbury, NY (US)

(72) Inventors: Robert L. Saxe, New York, NY (US); Steven M. Slovak, N. Massapequa, NY (US); Seth Van Voorhees, Short Hills, NJ (US); Gregory M. Sottile, East Hartland, CT (US); Dongyan Wang, Ithaca, NY (US)

(73) Assignee: RESEARCH FRONTIERS INCORPORATED, Woodbury, NY (US)

( * ) Notice: Subject to any disclaimer, the term of this patent is extended or adjusted under 35 U.S.C. 154(b) by 0 days.

(21) Appl. No.: 14/264,837

(22) Filed: Apr. 29, 2014

(65) Prior Publication Data

US 2014/0320950 A1    Oct. 30, 2014

Related U.S. Application Data

(60) Provisional application No. 61/817,608, filed on Apr. 30, 2013.

(51) Int. Cl.
| | |
|---|---|
| *G02B 26/00* | (2006.01) |
| *G02F 1/133* | (2006.01) |
| *A47F 11/06* | (2006.01) |
| *B44D 7/00* | (2006.01) |
| *G02F 1/1334* | (2006.01) |

(52) U.S. Cl.
CPC ............ *G02F 1/13318* (2013.01); *A47F 11/06* (2013.01); *B44D 7/00* (2013.01); *G02F 1/1334* (2013.01)

(58) Field of Classification Search
CPC .............................. A47F 11/06; G02F 1/1334
USPC ........... 359/296, 265, 320, 315, 237; 345/107
See application file for complete search history.

(56) References Cited

U.S. PATENT DOCUMENTS

| | | | |
|---|---|---|---|
| 4,247,175 | A | 1/1981 | Saxe |
| 4,407,565 | A | 10/1983 | Saxe |

(Continued)

FOREIGN PATENT DOCUMENTS

WO    WO 2013/049248 A2    4/2013

OTHER PUBLICATIONS

International Search Report mailed Sep. 4, 2014 in corresponding International Application No. PCT/US14/35988.

(Continued)

*Primary Examiner* — Tuyen Tra
(74) *Attorney, Agent, or Firm* — Ostrolenk Faber LLP

(57) ABSTRACT

A display device comprising a Suspended Particle Device film or other material for controlling the amount of illumination transmitted to an object from one or more light sources to protect the object from degradation by light is described. The display is capable of being dark when the object is not being viewed and being highly transmissive when the object is to be viewed. If desired, the display device may be controlled so as to provide a substantially constant amount of illumination when the object is viewed or intended to be viewed. A method of protecting an object using the display device is also provided.

36 Claims, 9 Drawing Sheets

(56) References Cited

U.S. PATENT DOCUMENTS

| | | |
|---|---|---|
| 4,772,103 A | 9/1988 | Saxe |
| 5,409,734 A | 4/1995 | Lee et al. |
| 5,461,506 A | 10/1995 | Check, III et al. |
| 5,463,491 A | 10/1995 | Check, III |
| 5,463,492 A | 10/1995 | Check, III |
| 6,301,040 B1 | 10/2001 | Chakrapani et al. |
| 6,416,827 B1 | 7/2002 | Chakrapani et al. |
| 6,900,923 B2 | 5/2005 | Chakrapani et al. |
| 6,936,193 B2 | 8/2005 | Saxe et al. |
| 7,361,252 B2 | 4/2008 | Slovak et al. |
| 7,800,812 B2 | 9/2010 | Moskowitz |
| 8,218,224 B2 | 7/2012 | Kwak et al. |
| 9,074,749 B2 * | 7/2015 | Seo ............................ F21V 7/00 |
| 2005/0136243 A1 | 6/2005 | Fisher |
| 2007/0188873 A1 | 8/2007 | Wardas |
| 2009/0027759 A1 | 1/2009 | Albahri |
| 2011/0100709 A1 | 5/2011 | Wang et al. |
| 2011/0234557 A1 | 9/2011 | Yang et al. |

OTHER PUBLICATIONS

Written Opinion of the International Searching Authority mailed Sep. 4, 2014 in corresponding International Application No. PCT/US14/35988.

* cited by examiner

Increase in the survivability of paper based philatelic, and Art collections given their susceptibility to UV radiation and VISIBLE light intensity

| UV component in VISIBLE light | Visible Light Intensity | | | |
|---|---|---|---|---|
| | 30,000 lux (average daylight) | 3,000 lux (near windows, fluorescent lamps) | 300 lux (Good visibility) | 30 lux (minimum needed for fair visibility) |
| + 750 mW/lm (daylight) | x 1 | x 10 | x 100 | x 1000 |
| + 750 mW/lm (good UV filter) | x 10 to x 30 | x 100 to x 300 | x 1000 to x 3000 | x 10,000 to x 30,000 |
| 1-10 mW/lm (best UV filter) | x 10 to x 100 | x 100 to x 1000 | x 1000 to x 10,000 | x 10,000 to x 100,000 |

FIG. 8

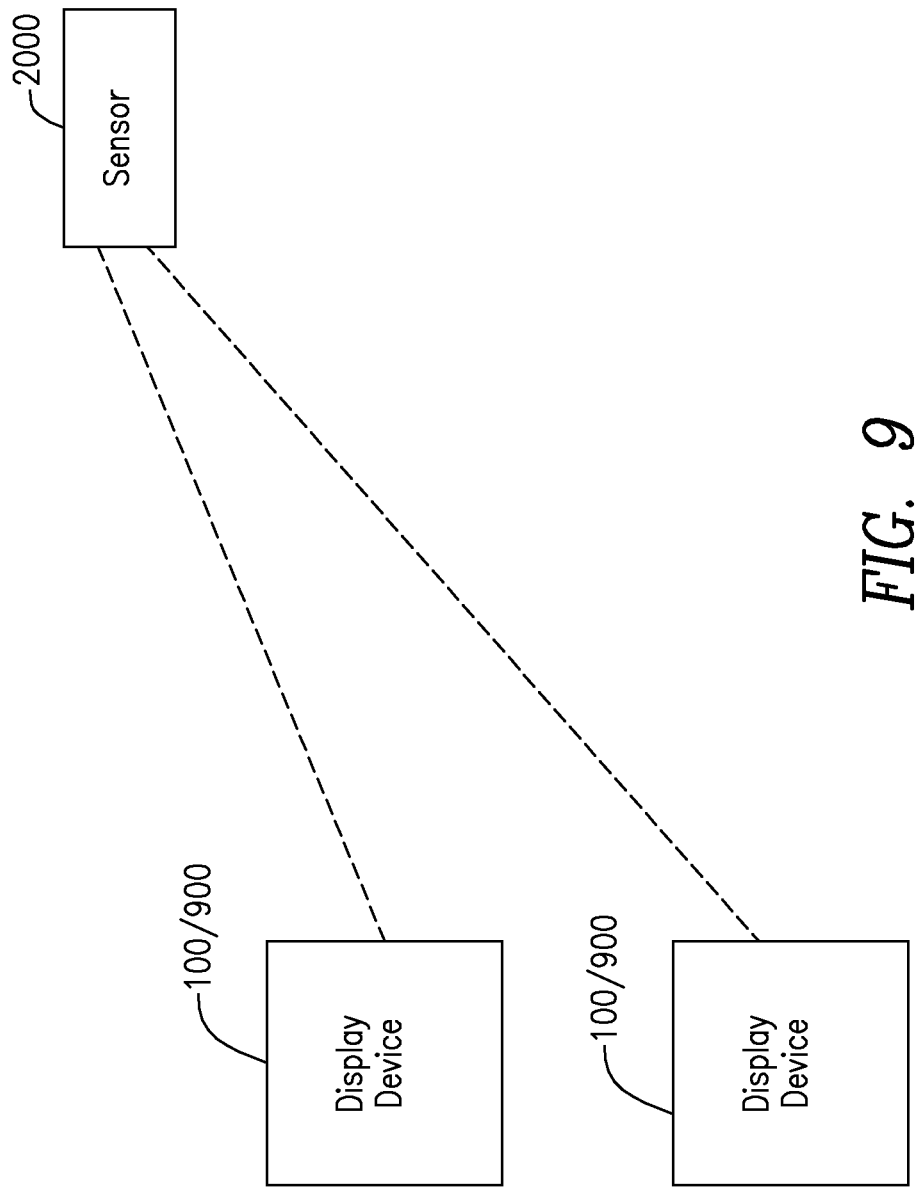

METHOD AND DEVICE FOR PROTECTING OBJECTS FROM DEGRADATION BY LIGHT WITH SUSPENDED PARTICLE DEVICE LIGHT VALVES

CROSS-REFERENCE TO RELATED APPLICATION

The present application is a nonprovisional and claims the benefit of priority from U.S. Provisional Patent Application No. 61/817,608 filed on Apr. 30, 2013, entitled "METHOD AND DEVICE FOR PROTECTING OBJECTS FROM DEGRADATION BY LIGHT WITH SUSPENDED PARTICLE DEVICE LIGHT VALVES," the entire contents of which are hereby incorporated by reference.

FIELD OF THE INVENTION

The invention is generally related to preservation of articles illuminated with light, including artificial light. Such preservation is typically achieved by interposing between the article to be preserved and a source of light, i.e., whether natural or artificial, a light valve incorporating a suspended particle device ("SPD") film, commonly referred to herein as a suspended particle device, a SPD light valve, or simply an SPD. The SPD light valves according to the present invention are used or intended for use as windows capable of varying the transmission of light passing therethrough in order to protect and/or otherwise shield objects of interest, e.g., historical or other valuable objects, located on the opposite side of the light valve from the light source, from degradation by light.

BACKGROUND

Environmental conditions are known to cause many types of articles to rapidly degrade in quality and/or appearance. Degradation can occur due to interactions caused by many factors, including temperature, air, and light.

In the prior art, a clear plastic or glass display case is sometimes used to protect articles from the effects of air and temperature. With some display cases, the interior is sealed from the exterior air to limit effects on, and interactions with, the articles. With some display cases, the air within the case is removed and replaced by an inert gas, such as nitrogen, argon, or the like. Display cases of the type described above are found in many museums and exhibition halls, and are typically very large, very heavy, and very complicated to maintain.

Another environmental condition includes exposure to light, both natural and artificial, the effects of which can damage articles and/or any items in the vicinity of the articles, for example, items made of plastic and/or paper. Light comprises wavelengths of ultraviolet (UV), visible, and infrared energy. In the prior art, during periods of non-display and storage, articles and the other items in their vicinity are typically protected from the effects of light via use of display case filters and shields. To further shield against the effects of light, UV filters and/or opaque shields may be placed or adhered to exterior facing windows and interior lights that are within the display or movement area of the articles. A very informative web site that discusses the effects of visible light and other environmental factors on paper-based articles can be referred to for further information at www.stampsrart.com.

FIG. 7 is a chart showing the wavelengths and the amount of different types of interior and exterior light that potentially can be present within an interior of a windowed structure. Because interior artificial sources of visible light can be relied upon to provide sufficient illumination, the intense and destructive exterior sources of visible light can be totally blocked via shields or curtains placed over exterior facing windows. Although filters and/or shields can be used to minimize, if not eliminate, the UV and infrared components of both the artificial and natural light that is represented by FIG. 7, unfortunately, the goal of elimination cannot be applied in the same manner to visible light, which is needed by humans to visually see (i.e. to view articles with).

FIG. 8 is a table that illustrates relative effects of visible light. Although, as discussed above, the harmful effects of natural visible light from external sources can be eliminated, the harmful effects of indoor artificial visible light (which is usually left turned on for long periods of the time, even when there may be no viewers present) can nevertheless still cause significant damage and, thus, should always be considered when illuminating aesthetic, historical, rare, and/or valuable articles. Representative values of visible light measured by a light meter in lux under various types of indoor and outdoor settings include: about 100,000 lux present under direct outdoor natural sunlight, about 10,000 lux present under shaded outdoor natural sunlight, about 5000 lux present under indoor natural sunlight illuminated, about 1000 lux present under artificial halogen lights, a range of about 125 lux present under a 100 watt tungsten bulb measured at 3 feet, 1 lux present under a candle measured at one foot. The amount of visible light that can be present under indoor visible light is illustrated in FIG. 8 by a set of ranges that span 3000 lux to 30 lux. FIG. 8 illustrates that depending on a level of UV light also present, the possible damage that can be inflicted on an article exposed to visible light can span a 10,000 fold range. Exposure to visible light is cumulative such that cumulative exposures to 100-500 lux of artificial visible light (a range of amounts that are present in typical homes and offices) can cause sensitive material (for example art prints, stamps, etc) to begin fading in as few as one or two years. In other words, if preservation is a goal, the harmful effects of visible light, whether artificial or natural cannot be ignored. In the prior art, for example in museumlike settings, the amount of visible light from artificial sources is typically reduced by a simple technique of "lowering the lights," which may include reduced wattage overhead lighting, or the flipping or turning of a switch to lower their intensity. Such techniques are highly dependent on someone, or something, being able to track and control the level of the light and, for this reason, in many instances, where artificial visible light has been identified as being of concern, the light is permanently kept in a dimmed condition. In the prior art, reduction of visible light is consequently achieved at a cost, for example, as occurs in the National Archives in Washington D.C., where treasures such as the Declaration of Independence are made much less enjoyable to view and study because of the uncomfortably low levels of illumination by artificial light (about 50 lux) that is used. Although museums such as The National Archives have the resources to be able to implement all that is needed to maintain their levels of light, because of cost and practicality private collectors typically and simply store their articles in containers and albums, and make them available for exhibition and viewing only intermittently. Unfortunately, when they do view or display their articles, private collectors do so by exposing them to the full effects of any indoor light and other environmental factors that may be present.

From time to time, it may be desired to more closely view a particular article, if not for personal pleasure, then for display, inspection, and the like. When prior art display cases are used for display or storage, such close inspection can normally be achieved only after a complicated and/or time-consuming process by which the display case is unsealed and/or opened. To minimize degradation of an article after removal from a prior art display case, additional filtering of light and climate control typically needs to be provided. With museums, the resources for implementation of additional climate control and light filtering are normally readily available. However, with private collectors, the apparatus and methods needed are typically too expensive and/or too difficult to implement. Thus, with private collectors, containers and albums to this day remain the storage method of choice. Because containers and albums in themselves provide no protection against light when open, and very little if any protection against other environmental effects, articles in private collections are typically subject to much more degradation than those in museums.

Two technologies that can be used to reduce transmission of light include photochromic and thermochromic technology. A property of photochromic material is that its transparency varies as a function of the amount of UV light it is exposed to. An example of photochromic technology known to those skilled in the art is that which is used to provide sunglass functionality, wherewith in the presence of UV light, eyeglass lenses can be made to darken, and in the absence of UV light, to lighten. Thermochromic technology is also known to provide light blocking functionality, but in response to changes in temperature and/or infrared wavelengths.

Although changes in transparency and opaqueness of photochromic material can be used to block visible light, a limitation arises in that the particular transparency of photochromic material can be made to change as a function of the UV light present. In situations where UV light has been prefiltered, for example by a UV filter placed over exterior facing windows and/or interior light fixtures, the photochromic functionality does not become activated. In such a case, where no, or very little, UV light is present, if it were desired to rely upon a photochromic material to shield an article from visible light, the photochromic material would fail to do so, and the article so shielded would remain exposed to its degrading effects.

As used herein, the term "light valve" describes a cell formed of two cell walls, usually constructed of plastic or glass, that are spaced apart by a small distance, with at least one wall being transparent. The walls have electrodes thereon, usually in the form of transparent, electrically conductive coatings. The electrically conductive coatings can be deposited on the walls in patterns so that different segments of the light valve can be selectively activated. Additionally, the electrodes on the walls may have thin, transparent dielectric overcoatings thereon. The cell contains a light-modulating element (sometimes herein referred to as an activatable material) which may, without limitation, be either a liquid suspension of particles, or all or a portion of the entire element may comprise a plastic film in which droplets of a liquid suspension of particles are distributed. As described hereinafter, moreover, a light valve may further comprise one or more additional layers to provide the light valve with additional capabilities.

The liquid suspension (sometimes referred to herein as a liquid light valve suspension, or simply as a light valve suspension) comprises small particles suspended in a liquid suspending medium. In the absence of an applied electrical field, the particles in the liquid suspension assume random positions due to Brownian movement. Hence a beam of light passing into the cell is reflected, transmitted or absorbed depending upon the cell structure, the nature and concentration of the particles, and the energy content of the light. The light valve is thus relatively dark in the OFF state. However, when an electric field is applied through the liquid light valve suspension in the light valve, the particles become aligned and for many suspensions most of the light can pass through the cell. The light valve is thus relatively transparent in the ON state. Further in regard to the passage of light, the $\Delta T$ is defined as the difference in visible light transmission between the OFF and ON states. If desired, intermediate states can be achieved with the use of an appropriate voltage.

For many applications it is preferable for all or part of the activatable material, i.e., the light modulating element, to be a plastic film rather than a liquid suspension. For example, in a light valve used as a variable light transmission window, a plastic film in which droplets of liquid suspension are distributed are preferable to a liquid suspension because hydrostatic pressure effects, e.g., bulging associated with a high column of liquid suspension, can be avoided through the use of a film and the risk of possible leakage can also be avoided. Another advantage of using a plastic film is that, in a plastic film, the particles are generally present within very small droplets, and, hence, do not noticeably agglomerate when the film is activated with a voltage.

A light valve film (sometimes referred to herein as an SPD film), as that term is used herein, means a film or sheet, or more than one thereof comprising a suspension of particles intended to be used in a SPD light valve. Such a light valve film usually comprises a discontinuous droplet phase of a liquid or liquids comprising dispersed particles (i.e., a liquid light valve suspension), such discontinuous phase being dispersed throughout a solid continuous matrix phase, wherein the phases are enclosed within one or more rigid or flexible solid films or sheets. After curing, the combined aforesaid phases may be referred to as a cured SPD emulsion, which may constitute a part of a light valve film, sometimes also referred to as a film or a film layer. The light valve film and/or a laminate of the light valve film may also comprise one or more additional layers, such as, without limitation, a film, coating or sheet, or combination thereof, which may provide the light valve film with one or more characteristics or capabilities such as, (1) scratch resistance, (2) protection from ultraviolet radiation, (3) reflection of infrared energy, (4) electrical conductivity for transmitting an applied electric or magnetic field to the activatable material, (5) dielectric overcoatings, (6) color tinting, (7) acoustic control, and (8) an additional transparent electrically conductive layer which can heat all or part of the film or light valve if an electric current (AC or DC) is passed therethrough. As used herein the terms, "light valve film" or "SPD film" or "film" shall be understood to also include laminated films.

A common (but non-limiting) construction for an SPD film has five layers, namely, from one side to the other, (1) a first sheet of a polyethylene terephthalate ("PET") plastic, conveniently 5-7 mils in thickness, (2) a very thin, transparent, electrically conductive coating of indium tin oxide ("ITO") acting or capable of acting as an electrode, on the first sheet of PET, (3) a layer of cured, i.e., cross-linked SPD emulsion, usually 2-5 mils in thickness and (4) a second ITO coating acting or capable of acting as an electrode on (5) a second PET plastic substrate. As stated previously, additional layers that provide other functions may optionally be added to the multi-layer SPD film described above. Typically, copper foil, conductive fabric or the like are affixed to the electrodes so that they extend beyond the perimeter of the SPD film for convenient connection to a suitable voltage source. Furthermore, the SPD film can be laminated (see U.S. Pat. No. 7,361,252 assigned to the Assignee of the present invention/application), for example, between transparent hot melt adhesive films and/or glass or plastic sheets to provide strength and rigidity and to protect various parts of the combined unit from environmental stresses which may, otherwise, damage its performance characteristics.

Electric power to activate the light valve film can be obtained from any conventional or non-conventional source. For example, the assignee of the present invention/application has publicly demonstrated operation of an SPD film and light valve powered by photoelectric energy, which may be derived from solar energy or a suitable alternative light source, such as a lamp.

U.S. Pat. No. 5,409,734 exemplifies a type of non-crosslinked light valve film that is made by phase separation from a homogeneous solution. Light valve films made by cross-linking (curing) of emulsions are also known. The apparatus and methods of the present invention are specifically directed to the use of the latter type of film, i.e., film comprising a layer formed by cross-linking an emulsion, and to laminated films produced thereby. See, for example, U.S. Pat. Nos. 5,463,491 and 5,463,492 and U.S. Pat. No. 7,361,252, all of which are assigned to the assignee of the present invention/application. Various types of SPD emulsions, and methods for curing the same, are described in U.S. Pat. Nos. 6,301,040; 6,416,827 and 6,900,923, all of which are assigned to the assignee of the present invention/application. Such films and variations thereof may be cured through cross-linking brought about by exposing the films to (1) ultraviolet radiation, (2) electron beams or (3) heat. All of the patents and patent applications, as well as any other references cited herein are specifically incorporated by reference.

A variety of liquid light valve suspensions are well known in the art and such suspensions are readily formulated according to techniques well known to one having at least an ordinary level of skill in this field. The term "liquid light valve suspension", as noted above, when used herein means a liquid suspending medium in which a plurality of small particles are dispersed. The liquid suspending medium comprises one or more non-aqueous electrically resistive liquids in which there is preferably dissolved at least one type of polymeric stabilizer that acts to reduce the tendency of the particles to agglomerate and to keep them dispersed and in suspension.

Liquid light valve suspensions useful in the present invention may include any of the so-called prior art liquid suspending media previously proposed for use in light valves for suspending the particles. Liquid suspending media know in the art which are useful herein include, but are not limited to, the liquid suspending media disclosed in U.S. Pat. Nos. 4,247,175; 4,407,565; 4,772,103; 5,409,734; 5,461,506; 5,463,492 and 6,936,193, the disclosures of which are incorporated herein by reference. In general, one or both of the suspending medium or the polymeric stabilizer typically dissolved therein is chosen so as to maintain the suspended particles in gravitational equilibrium.

The polymeric stabilizer, when employed, can be a single type of solid polymer that bonds to the surface of the particles, but which also dissolves in the non-aqueous liquid(s) which comprise the liquid suspending medium. Alternatively, there may be two more solid polymeric stabilizers serving as a polymeric stabilizer system. For example, the particles can be coated with a first type of solid polymeric stabilizer, such as nitrocellulose which, in effect, when dissolved, provides a plain surface coating on the particles, together with one or more additional types of solid polymeric stabilizer that, when dissolved, bond to or associate with the first type of solid polymeric stabilizer and which also dissolve in the liquid suspending medium to provide dispersion and stearic protection for the particles. Also, liquid polymeric stabilizers can be used to advantage, especially in SPD light valve films, as described for example in U.S. Pat. No. 5,463,492.

Inorganic and organic particles may be used in a light valve suspension, and such particles may be either light absorbing or light reflecting in the visible portion of the electromagnetic spectrum.

Conventional SPD light valves have generally employed particles of colloidal size. As used herein the term "colloidal" generally means that the particles have a largest dimension averaging 1 micron or less. Preferably, most polyhalide or non-polyhalide particles used or intended for use in an SPD light valve suspension will have a largest dimension which averages 0.3 micron or less and more preferably averages less than one-half of the wavelength of blue light, i.e., less than 2000 Angstroms, to keep the light scatter extremely low.

As noted above, many items can be degraded due to exposure to light. As defined herein, "light" is defined as comprising any or all of infrared, visible and ultraviolet electromagnetic radiation except where otherwise specified. Light can cause degradation because it is composed of packets of energy, known as photons, which may cause changes in an object impacted thereby. As the wavelength of the light decreases, the energy of each individual photon increases. Hence, ultraviolet radiation is more potentially degrading than visible light which, in turn, is more potentially degrading than infrared (i.e., heat) radiation.

Objects that can be degraded by light are of many types. Without limitation thereto, such objects may comprise textiles, books, documents, paintings, other works of art, photographs, stamps, and other philatelic items, antiques and artifacts.

Many such objects are valuable. Some of them, in fact, may be considered as "priceless" by their owners or admirers. Accordingly, a methodology for displaying the objects while greatly reducing degradation from sunlight, lamps and other sources of light is urgently called for.

An attempt to describe the problem and to suggest some possible ways to ameliorate it is set forth in Published U.S. Patent Application No. 2007/0188873 A1 of Wardas published on Aug. 16, 2007 and subsequently abandoned. The disclosure set forth in the subject reference is incorporated herein by reference.

The amount of visible light that an object is exposed to may vary over a wide range, depending upon whether such exposure occurs outdoors or indoors and the type of illumination. While the method and apparatus of the present invention is not limited to use with visible illumination, such visible illumination may vary from more than 100,000 lux outdoors to as little as 1 lux indoors. Artificial light sources, on the other hand, are available in a number of different types including, without limitation, incandescent, fluorescent, halogen, tungsten and arc lamps, as well as light-emitting diodes.

In, for example, paragraphs [0009], [0010] and [0011] the Wardas publication proposes to protect objects from damage by light with any of three technologies which can function to block such light, namely photochromic, thermochromic and electrochromic technology. As noted above, photochromic technology is used, for example, in certain types of sunglasses in which the lenses darken when exposed to UV-containing light, such as sunlight. As also noted, thermochromic technology can block light when the materials respond to changes in temperature. Electrochromic technology uses an electric current to darken the electrochromic material, e.g., in an automobile rear-view mirror.

Unfortunately, however, each of the three aforesaid technologies have substantial deficiencies that render them impractical for protecting objects from degradation by light.

As a result, to the best of the present inventors' knowledge, none of these technologies has yet been used in a commercially successful manner for such a purpose.

In order for a light-protectant technology to be of any real value, the present inventors believe that there are five criteria that a light-controlling device or system must meet, as follows:

1. In its darkest state, it must have a maximum of 20% visible light transmission, preferably a maximum of 10% and most preferably a maximum of 5%;
2. In its clearest state it must have a visible transmission exceeding 50%, and preferably exceeding 60%;
3. Blockage of ultraviolet radiation should be at least 95% and preferably greater than 99%;
4. A change from its clearest state to its darkest state, or vice-versa, must occur in 5 seconds or less; and
5. In its unpowered, i.e., OFF state it must be dark, so that in the event of a power outage the objects to be protected will still be protected from impingement by light.

Photochromic lenses require exposure to UV in order to darken, and because UV is the most degrading form of light affecting the sort of objects one typically wishes to protect, e.g., materials including but not limited to textiles, books, documents, paintings, other works of art, photographs, stamps, and other philatelic items, antiques and artifacts as noted above, permitting UV light to impinge upon such an object is inherently risky. Moreover, if no UV energy is present, the photochromic lenses or window material won't darken and, hence, the object will not be protected from the effect of visible light. In addition, photochromic lenses reportedly require 35 seconds to darken just from 70% light transmission to 30% light transmission, and a matter of minutes to darken or lighten completely. This is an unacceptably long time to wait.

On the other hand, a typical thermochromic material has a light transmission range of 14% to 69%, which would possibly be an acceptable range if there were no other problems with this technology. An important factor to keep in mind in this regard, however, is that the ambient temperature must be ranged above a comfortable indoor temperature in order to darken the material. Furthermore, in any event, about 20 minutes is required for the change from light to dark, or vice-versa, to occur. This is far too long for someone to wait for an exhibit to become visible when waiting, e.g., in front of a display case in a museum. Additionally, it allows too much time for visible light to impinge upon, and thus degrade, an object that it is desired to protect.

Electrochromic (EC) windows are reported to have a light transmission range of 2% to 62% and can reject infrared and UV radiation reasonably well. Thus, if they could turn on and off quickly, they might be acceptable for protecting objects from light. Unfortunately, this is not the case. The response speed of an electrochromic device is an inverse function of its size. Display cases, picture frames and partitions used in museums, for example, might range from perhaps one square foot to several square meters in size. An electrochromic window as small as one square foot would probably require at least 30 seconds to darken or lighten completely, and an electrochromic window measuring just one square meter in size would require tens of minutes to darken or lighten fully. Such an arrangement is, therefore, completely impractical. In addition, in the event of a power outage, an electrochromic window defaults to its most light transmissive state, which would expose the object that is supposed to be protected to the degrading effects of light.

As can be seen, then, from the discussion above, none of the three technologies discussed in the Wardas publication, i.e., photochromic, thermochromic and/or electrochromic technology, meet all of the above-described criteria (i.e., nos. 1-5) required for obtaining a useful degree of protection of objects that are to be protected from the damaging effects of light.

SUMMARY OF THE INVENTION

Recent improvements in suspended particle devices and films have made SPDs a promising choice for use in protecting valuable objects located, e.g., in a museum display case, from the damaging effects of visible light. Light SPD films can now be produced with a light transmission range of 2% (dark state) to 62% (light or clearest state). By using low-iron or iron-free glass or clear plastic for the window material and by including anti-reflection coatings on one or both air-window surfaces, ranges of 3.5% to 72% and 0.5% to 51.3% have been achieved with the use of SPDs. In regard to the values noted above, it is important to keep in mind that some prospective users desire a very dark off-state, whereas other users are more concerned with having an exceptionally transmissive clear state.

Some display cases, picture frames and/or partitions may be protected with SPD light valves using replaceable or rechargeable battery systems. Since SPD light valves do not require power in the dark (OFF) state, such battery systems should last much longer than other technologies that do require power in order to become dark, e.g., an electrochromic window for example.

Further to the above, laminated SPD films can comprise plastic interlayers that reject heat (i.e., infrared) energy and which can also block more than 99% of incident ultraviolet radiation. SPD films and devices of any size, even those measuring several square meters, can change from the darkest state to the clearest state, or vice-versa, in only approximately three seconds when a suspended particle device (SPD) is utilized for attenuating the passage of light toward an object that it is desired to preserve.

Still further, in order to better view and more clearly see an object in, e.g., a museum display case, or an art object located in a frame, a lighting source may be used within or in conjunction with the display case or frame, or in the case of an object located behind a partition. Appropriate sensors, software and electronics that would be very familiar to one having at least an ordinary level of skill in the relevant field of art can be used such that the light source and the SPD film or light valve will be activated or deactivated either only be manual means, or else automatically when an individual approaches or leaves the object to be viewed.

Maximizing a laminate's visible light transmission is an important feature of any light valve system. A higher transmission level greatly improves the functionality and performance of the product that incorporates such a light valve, particularly in the case of artifact display window products, but also in automotive, aerospace, architectural and marine products that use such light valves.

SPD films with a cured emulsion coating approximately 65 microns in thickness and using ordinary glass typically can have a range of visible light transmission between 2% and 62%. It was expected that laminating such films, which adds two layers of 3-4 mm thick glass, plus two interlayers, would result in a decrease in visible light transmission in the case of such a laminate, in comparison to what is obtained with the use of just the starting film. Unexpectedly, however, the present inventors were able to significantly increase the maximum transmission level of the resulting light valve system from 62% in an unlaminated film to 73% by laminating the SPD film with low-iron glass containing a single-sided antireflective coating. In addition to improving the overall visible light transmission level in its clear state, the lamination process also increased the range of visible light transmission from 60ΔT to 69ΔT. The utilization of more than one antireflective coating may produce even further improvements. The higher level of visible light transmission allows for better performing object display systems, i.e., display cases, frames, partitions, that eliminate or reduce the need for or the intensity of interior lighting systems located within such display system(s). Such enhanced visible light performance also reduces the artifact's exposure to visible light that can, as noted above, result in subsequent irreversible damage to the object to be protected.

Still further, the electronic control of SPD-based object display systems according to the present invention (constituting, e.g., display cases, frames and/or partitions) containing one or more sensors, i.e., for sensing light, temperature, moisture, oxygen, etc., may produce one or more signals that result in a change in the tinting of the SPD light valve that, in turn, reduces the measured sensor'(s) reading to a more desired level. For example, an artifact may reside in a room with exterior windows that result in wide swings in the intensity of light in the room. In an embodiment, then, a photon sensor would be used to instruct the SPD light valve to tint more when excessive light is present, but be more clear when less light is present. This would maintain the experience of those viewing the artifact while continuing to minimize the destructive impact on the artifact due to excessive light damage.

Many display systems are also provided with interior lighting systems that enhance the light available to view an artifact. It is desirable, therefore, to minimize the damage due to heat generated by these interior lighting systems by optimizing the amount of light from the room entering the display, as well as the amount of light/heat energy produced by the interior lighting system. It is preferred that the interior lighting system utilize a light source that provides little heat, such as an LED for example. This can also be accomplished by incorporating a light sensor that would control the tinting level of the SPD light valve in order to maintain the optimal levels of interior and room light that the artifact is exposed to. The interior light system may be controlled in conjunction with the SPD to provide the optimal levels of light while protecting the object from degradation. Control may be provided by a direct connection between the sensor and the interior light system or may be provided via a controller, such as a microprocessor, for example, connected to both the sensor and the interior light system. While a microprocessor is specifically mentioned, any suitable control element may be used.

Thus the present method and apparatus can be seen to meet each of the five criteria that are required to protect objects from degradation by light and which can, furthermore, help to control and regulate natural and artificial lighting conditions in the vicinity of such object(s).

The present invention thus facilitates preservation of articles while at the same time minimizing and eliminating the limitations that the prior art imposes on the ability to view, display, exhibit, and enjoy the articles. In contrast to the prior art, the present invention enables preservation of articles via selective filtering of interior, exterior, and/or other environmental effects. In one embodiment, selective filtering is achieved via a self-contained apparatus that minimizes and in some cases eliminates the need for heavy and bulky housings and/or additional environmental controls and connections. In one embodiment, selective filtering is achieved via an apparatus that can be readily moved from one location to another.

In one embodiment, an apparatus for selective filtering comprises a self-contained unit. In one embodiment, an apparatus for selective filtering can be made to be attached to, or be part of, housing. In one embodiment, an apparatus for selective filtering may be made to be a removable part of housing.

In one embodiment, at least one display apparatus or device for selectively shielding articles from illumination emanating from one or more artificial light source comprises at least one layer of a suspended particle device (SPD) material laminated, for example, between transparent hot melt adhesive layers, the afore mentioned additional layers (i.e., ultraviolet protection, infrared reflection) and/or glass or plastic sheets such that the display device is capable of having a plurality of states of transparency that are electrically controllable to selectively pass the illumination through the display apparatus and so as to selectively limit illumination of articles in the path of the illumination, wherein as the illumination passes through the display apparatus it is limited by the SPD device to a predetermined intensity and/or duration of illumination. A light meter or sensor inside the display device is operable to quantify the cumulative light entering the display case and may be utilized to track the artifact's or object's within the display apparatus total exposure. In various embodiments of the invention, the artificial light source may comprise incandescent, halogen, fluorescent, tungsten, arc, tungsten halogen, high-intensity discharge, LED, low-pressure sodium, metal halide, and/or mercury vapor light sources. In one embodiment, the display apparatus is coupled to at least one circuit element, wherein upon detection of an event, the at least one circuit element generates a signal, and wherein the signal is functionally coupled to the display apparatus to change a state of its transparency from a first state to a second state. In embodiments, the detection of an event may comprise, but is not limited to, an amount of visible light illumination, an amount of infrared light illumination, an amount of UV light illumination, an environmental condition, presence of an article, presence of a person, and/or a time of day. In one embodiment, the detection of an event comprises a measurement of an amount of the illumination before the illumination passes through the display apparatus. In one embodiment, detection of an event comprises a measurement of an amount of the illumination after the illumination passes through the display apparatus. In one embodiment, wherein when the measurement comprises more than a particular value, the signal is operatively coupled to the display apparatus to change a state of the display apparatus to be more darkened, and wherein when the measurement comprises less than the particular value, the signal is operatively coupled to the display apparatus to change a state of the display apparatus to less darkened. In one embodiment, the predetermined amount of illumination is in a range between about 50 lux and about 100 lux. In one embodiment, the predetermined amount of illumination is less than about 500 lux. Protection from UV and IR light may also been incorporated into the SPD. In one non-limiting example, UV absorbing materials including, but not limited to, benzotriazoles, commonly known to those skilled in the art may be incorporated into the afore mentioned hot melt adhesive films and/or the glass or plastic sheets that, along with the SPD film, comprise the SPD laminate. Incorporation of IR reflecting materials including, but not limited to, low emissivity coatings, commonly known to those skilled in the art can be incorporated into the afore mentioned hot melt adhesive films and/or the glass or plastic sheets that, along with the SPD film, comprise the Display device.

In one embodiment, a display apparatus to control illumination of one or more articles by visible light comprises a display case, the display case comprising a plurality of side portions, wherein the side portions define a space within which the one or more articles can be disposed, wherein at least one of the plurality of side portions comprises a SPD material that can be controlled to have a plurality of transparencies; and a source of voltage, wherein a selective application of the voltage to the SPD material controllably changes a transparency of the one or more side portions comprising the SPD material, wherein during periods of viewing of any articles that may be disposed within the space a selective application of the voltage is used to change a transparency of the respective side portion(s) to allow the interior space to be illuminated with a level of the visible light that is comfortable for viewing and which, at the same time, limits damage that could be caused to the article(s) by the visible light, and wherein during periods of non-viewing a selective application of the voltage is used to change a transparency of the at least one side portion to be in a substantially darkened state to further limit visible light damage to any of the articles that may be disposed within the space. In embodiments, articles that may be disposed within the space comprise: paintings, art prints, art items, philatelic items, stamps, photos, documents, letters, books, and artifacts. In one embodiment, the display case comprises a moveable frame. In one embodiment, the display case comprises an encapsulation. In one embodiment, the display case comprises a picture or painting frame. In one embodiment, a difference in the amount of illumination present within the space when a transparency of the at least one side portion comprising the SPD material is changed between a substantially clear state and a substantially darkened state does not exceed about 3000 lux. In one embodiment, a difference in the amount of illumination present within the space when a transparency of the at least one side portion is changed between a substantially clear state and a substantially darkened state does not exceed about 1000 lux of visible light. In one embodiment, a difference in the amount of illumination present within the space when a transparency of the at least one side portion comprising the SPD material is changed between a substantially clear state and a substantially darkened state does not exceed about 5000 lux of visible light.

In one embodiment, a method of displaying and protecting an article placed under the illumination of visible light comprises positioning an article on a support; positioning a display apparatus comprising an SPD material between the article and a source of the visible light; and electrically controlling a transparency of the SPD material to controllably vary illumination of the article by the visible light. In one embodiment, the illumination of the article is controllably limited to a value. In one embodiment, the value is in a range of about 50 to 500 lux. In one embodiment, the visible light comprises artificial visible light. In embodiments, the article comprises one or more of: paintings, art prints, art items, philatelic items, stamps, photos, album pages, documents, letters, books, artifacts, and storage containers.

In one embodiment, a display apparatus comprises a visible light transmission means for selectively illuminating an article with visible light, whereby damage to the article from degrading effects caused by the visible light is minimized during periods of illumination of the article.

Other features, aspects, benefits, advantages, and embodiments are also within the scope of the present invention, and will be better understood with reference to the Description, Drawings, and claims that follow.

BRIEF DESCRIPTION OF THE DRAWING FIGURES

FIG. 8 is a chart that illustrates relative effects of visible light.

FIG. 9 illustrates an embodiment in which an external sensor is provided to determine conditions in an area and provide control signals to one or more display elements in the area based on the conditions.

DETAILED DESCRIPTION

Figure 1:
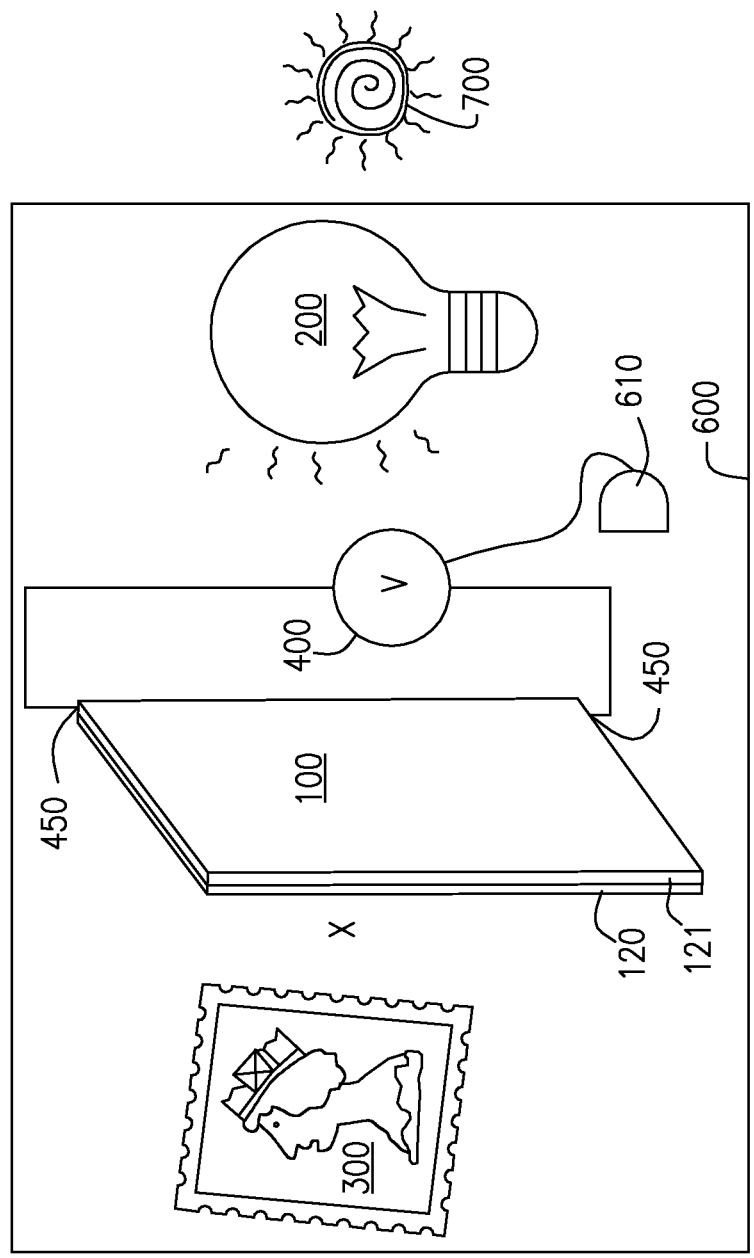
FIG. 1 is a representation of a display element disposed between an article and an artificial and/or indoor source of light.

Reference will now be made in detail to several embodiments of the invention that are illustrated in the accompanying drawings. Wherever practicable, the same or similar reference numerals are used in the drawings and the description to refer to the same or like parts or steps; however, to simplify the disclosure, the same or similar reference numerals may in some instances refer to parts or steps that comprise variants of one another. The drawings are in simplified form and not to precise scale. For purposes of convenience and clarity directional terms, such as top, bottom, left, right, up, down, over, above, below, beneath, rear, and front may be used with respect to the accompanying drawings. These and similar directional terms should not be construed to limit the scope of the invention in any manner. The terms "couple," "connect" and similar terms with their inflectional morphemes are used interchangeably, unless the difference is noted or otherwise made clear from the context. These terms do not necessarily signify direct connections, but may include connections through intermediate components and devices. Details in the description and drawings are provided to enable and understand inventive principles and embodiments described herein and, as well, to the extent that would be needed by one skilled in the art to implement the principles and embodiments in particular applications that are covered by the scope of the claims. The term "article" or "object" are synonymous and may be depicted, described, or refer to a specific type of article or object herein, but it should be understood that the scope of the articles or objects that the embodiments of the present invention may be implemented for uses that are almost unlimited, and for this reason, the present invention should be limited only by the scope of the claims that follow. The term "embodiment(s)" may refer to a particular apparatus or process, and not necessarily to the same apparatus or process. Thus, the number of potential embodiments is not necessarily limited to one or any other quantity.

A methodology for modulating the transmission of light that has been found by the present inventors to improve upon one or more of the limitations of the prior art to minimize damage from light to articles during periods of display, viewing and storage is the use of SPD light valves which, in fact, for many years has been used or proposed for use for modulating light in a variety of applications including, e.g., alphanumeric displays, filters for lamps, cameras, displays and optical fibers; and windows, toys, sun visors, eyeglasses, goggles, mirrors, light pipes and the like to control the amount of light passing therethrough or reflected therefrom as the case may be. Examples of windows include, without limitation, architectural windows for commercial buildings, greenhouses and residences; windows, visors and sunroofs for automotive vehicles, boats, trains, planes and spacecraft; windows for doors including peepholes; and windows for appliances such as ovens and refrigerators, including compartments thereof. As used herein the term "light" comprises electromagnetic radiation having wavelengths in the ultraviolet, visible and/or infrared regions of the electromagnetic spectrum.

Referring to FIG. 1, and other Figures as needed, there is seen a representation of a material disposed between an article and an artificial and/or indoor source of light. In one embodiment, the material, or display element 100 comprises one or more electrically responsive layers of an SPD material, i.e., 120 and/or 121. Display element 100 can be electrically controlled to selectively change its ability to pass or block visible, ultraviolet (UV), and infrared wavelengths of light (hereafter referred to as transparency, which may further be referred to further herein as states of transparency that include opaque/darkened, clear, and states therebetween) In one embodiment, a particular application of a voltage V across one or more electrically responsive layers of SPD material 120/121 causes material 100 to change to a particular state (shown in FIG. 1 to be in a generally dark state). In a preferred embodiment, the display element 100 is disposed between an article 300 and an artificial indoor source of light 200, for example, incandescent, halogen, fluorescent, tungsten, arc, tungsten halogen, high-intensity discharge (HID), light emitting diode (LED), low pressure sodium (SOX), metal halides (MH), and mercury Vapor Lamps (MVR) and/or other sources of light as may be used to illuminate the interior 600 of building like structures such as homes, offices, museums, exhibition halls, arenas, and the like. In one embodiment, wherein a source of visible light 200 emits an illumination of about 500 lux, as may be present in a typical home or office and as could be measured by a light meter at a position (as indicated generally by Y) to one side of the display element 100, and with the element 100 in a generally clear state, the illumination of the artificial source of light 200 is measured to be respectively between about 450 lux at a position (as indicated generally by X) to another side of the display element 100, with this reduction in the illumination resulting because in some embodiments even in a substantially clear state, a display element 100 may not be completely clear, for example, because of one or more of inherent characteristics of the display element 100 used. In other embodiments, the display element 100 may be disposed between an article 300 and a natural source of light 700, for example as may be present exterior to a building structure 600; or the display element 100 may be disposed at a position between an article 300 and both a natural source of light 700 and an artificial source of light 200. In one embodiment, the display element 100 is operatively attached or coupled to one or more electrical connection 450, via which a voltage V from a voltage source 400 is applied. In one embodiment, an electrical connection 450 comprises one or more conductive lead, conductive trace, conductive electrometric, edge connector, a solder connection, and/or other connections as could be implemented by those skilled in the electrical connection arts. In one embodiment, the voltage V comprises particular amplitude and/or current and/or polarity and/or frequency, as could implemented by those skilled in the voltage source arts, and as would be needed to selectively change a state of the transparency of material 100. The display element 100 may be connected to a base which receives the object to be viewed.

Figure 2:
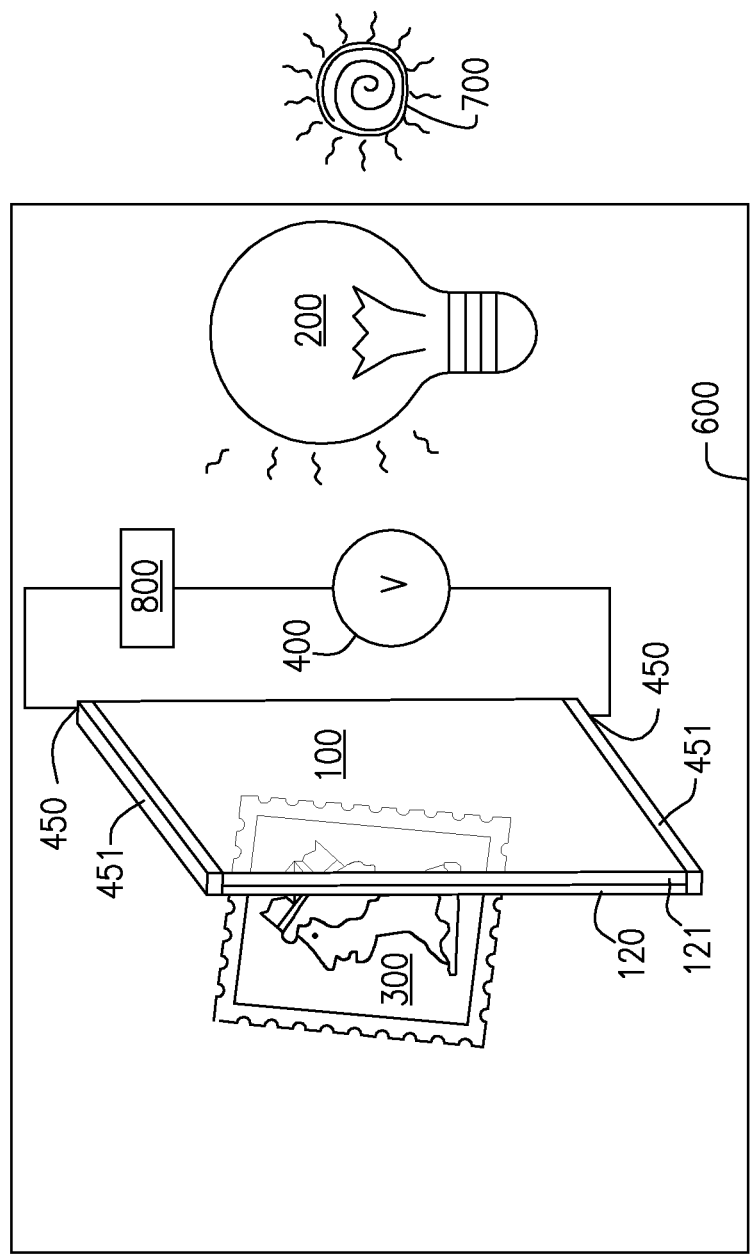
FIG. 2 is a representation of a display element in a transparent state that can be selectively controlled to be between opaque/darkened and bleached/clear.

Referring now to FIG. 2, and other Figures as needed, there is seen a representation of a display element in a transparent state that can be selectively controlled to be between opaque/darkened and clear. In embodiments, application of a particular voltage V to display element 100 can be used to effectuate a particular transparency of display element 100 to be in a darkened state, a clear state, or a state between a darkened and clear state. Accordingly, in an exemplary embodiment, with a source of visible light 200 that emits a range of illuminations of about 100 to 500 lux as could be measured by a light meter at a position (as indicated generally by Y) to one side of the display element 100, and with a transparency of the display element 100 in a particular state between a darkened state and a clear state, the illumination of the artificial source of light 200 may be measured to be no more than between about 50 to 100 lux at a position (as indicated generally by X) to another side of the material 100.

The materials employed for the conductive layers are well known to those skilled in the art. Exemplary transparent conductive layer materials include coatings of indium oxide, indium tin oxide, doped indium oxide, tin oxide, doped tin oxide, zinc oxide, doped zinc oxide, ruthenium oxide, doped ruthenium oxide, carbon nanotubes and the like, as well as thin metallic coatings that are substantially transparent, such as transition metals including gold, silver, aluminum, nickel alloy, and the like or conductive polymer coatings. It is also possible to employ multiple layer coatings, such as those available from Pilkington under the trade name of TEC-Glass®. or those available from PPG Industries under the trade names SUNGATE®. 300 and SUNGATE®. 500. The conductive layers may as needed be further treated with appropriate anti-reflective or protective oxide or nitride layers.

It is identified that a display element 100 as described herein may in some instances advantageously utilize one or more structures 451, which in embodiments can be used to enable protection, support and/or electrical connections, movement, handling, mounting, and other functionality that may be desired or needed. In exemplary embodiments, one or more structures 451 may comprise one or more of a conductive or non conductive support edge, protective edge, support frame, or the like.

In one embodiment, to minimize exposure of an article 300 to light, a transparency of a display element 100 is maintained in a substantially darkened state during periods of non-display or storage. In one embodiment, during periods of display, a viewer or other person may be given control over application of voltage V to display element 100, in which case the viewer or other person could be given control over the transparency of the display element 100 and, as well, control over the amount of visible light with which he/she could illuminate an article 300 with. It is identified that independent of a particular transparency of display element 100, a display element 100 may itself provide substantial filtering of UV and/or infrared light all the time, both during periods of viewing, non-viewing, and storage, such that an article 300 placed under a display element may be substantially protected from all but visible light all the time. Thus, whether or not a user was given control over voltage V, the prior art use of external UV filters, external shields over room lights and windows, and/or reduction of room illumination can be minimized or eliminated, and enjoyment and control over viewing of an article 300 can be accordingly enhanced. Nevertheless, it is identified that during the periods of time that a user might be given control over voltage V, an article 300 could be undesirably exposed to more than an acceptable amount of visible light. Accordingly, in one embodiment, user control over the transparency of a display element 100 (i.e. control over the voltage V) can be intentionally limited to allow only some, but not all, visible light to pass through the element to provide illumination of an article 300. In one embodiment, whether a person is provided control over voltage V, upon the occurrence and/or detection of an event, voltage V may be controlled by one or more circuit or circuit element 800, as could be implemented by those skilled in the electronic arts.

In one embodiment, upon the occurrence and/or detection of an event, one or more circuit or circuit elements 800 generates a signal and/or a voltage V, whereby the voltage V is applied to display element 100 so as to selectively effectuate a change in the element's transparency. In embodiments, an event may occur and/or be detected at positions generally indicated as X and/or Y, as could occur on either side of a display element 100. In embodiments, an event may be detected by a sensor that is operatively coupled to the one or more circuit elements 800. In embodiments, the event comprises a particular level of illumination by visible light, illumination by infrared light, illumination by UV light, an environmental condition, the presence of an article or person, a time of day, or other events that may naturally or unnaturally occur at, near, or in the vicinity of an article 300. In one embodiment, a particular level of visible light illumination is that which is present at a position (generally indicated by Y) between display element 100 and an indoor source of light 200. In one embodiment, a particular level of visible light illumination is that which is present at a position (generally indicated by X) between display element 100 and an article 300. In an embodiment, the sensor may be a light meter that measures visible light, UV light and IR light and also calculates or otherwise provides for total cumulative exposure levels of each type of light. In another embodiment, the sensor may monitor temperature. This information may be stored, or may be communicated to a controller (not shown), either included in the display apparatus or remotely located. In another embodiment, the sensor may be an acoustic sensor to allow for voice activation of the display element 100.

In a preferred embodiment, an event comprises detection of a level of visible light illumination that is desired to be present at a position (generally indicated by X) between a display element 100 and an article 300. In a preferred embodiment, a level of visible light illumination that is desired is a particular value and/or within in a range of about 50-100 lux, which within a range of visible light that is accepted by most museums as being the maximum amount of visible light that articles susceptible to light damage should be illuminated with. In one embodiment, if a level of light in a range of about 75-100 lux is measured, for example by a light sensor placed at a position generally indicated as X, one or more circuit or circuit elements 800 selectively causes a voltage V to be reduced to display element 100 to effectuate a state of its transparency to be more darkened. In one embodiment, if a level of light below a range of about 50-75 lux is measured at a position generally indicated as X, one or more circuit or circuit elements 800 selectively causes a voltage V to be applied to display element 100 to effectuate a state of its transparency to become less darkened. In this manner, illumination of an article can be controllably maintained to a particular comfortable viewing level between 50-100 lux and at the same time protect the article from damage that could occur from full exposure to any visible light that may be present at a position generally indicated as Y. In one embodiment, illumination of an article can be controllably maintained between 0-100 lux to protect the article from damage that could occur from full exposure to any visible light that may be present at a position generally indicated as Y.

Although a preferred range of lux for displaying and viewing articles has been described above to comprise about 50-100 lux, it is identified that other ranges may be desirable as well, as long as such ranges would be less than the amount of ambient visible light illumination that might be present at a position generally indicated as Y. For example, if an amount of ambient visible light illumination is 1000 lux, in some embodiments it might be adequate that the amount of illumination at a position generally indicated as X was maintained at some particular value or within a particular range less than 1000 lux, in which case, although an article might not be optimally protected from the effects of the visible light, because the illumination would be reduced, the effects would at least be slowed.

In an exemplary embodiment, a display element 900 comprises an area of about 24×24 square inches and a thickness of about ⅝ inch. In other embodiments, the display material 900 may comprise a thickness of on the order of 0.1 inch or less. In other embodiments, the display material 900 may comprise other geometries, other areas, and other thicknesses, as would be permitted, be necessary, or be desired for use in a particular application.

In exemplary embodiments, a display element 900 is appropriately dimensioned to shield, view, and display articles 300 that comprise one or more of: artifacts, paintings, art prints, philatelic items, photos, album pages, documents, books, storage boxes, antiques, jewelry, coins, liquids, inorganic articles, organic articles, display cases and other articles, the list of which is should be limited only the scope of the claims.

In one embodiment, a transparency of display element 900 can be made to change states between clear and darkened with application of voltages V that range between about 0-110 volts. It is identified that, if desired, when low operating voltages and/or power are used, a voltage source 400 and/or one or more circuit or circuit elements 800 can be made to comprise a small and light weight form factor. In one embodiment, a small and light weight form factor voltage source 400 allows display element 900 to be used in a wide number of both moveable and fixed applications, whether indoors or outdoors. For example, in one embodiment, a voltage source 400 may comprise a battery and/or battery conditioning circuit, both of which, if desired, can be placed or packaged with the display element 900, for example, as part of structure 451, all of which can then as needed or as desired be moved from location to location without need for external wiring, connections, and/or power sources 610.

Figure 3:
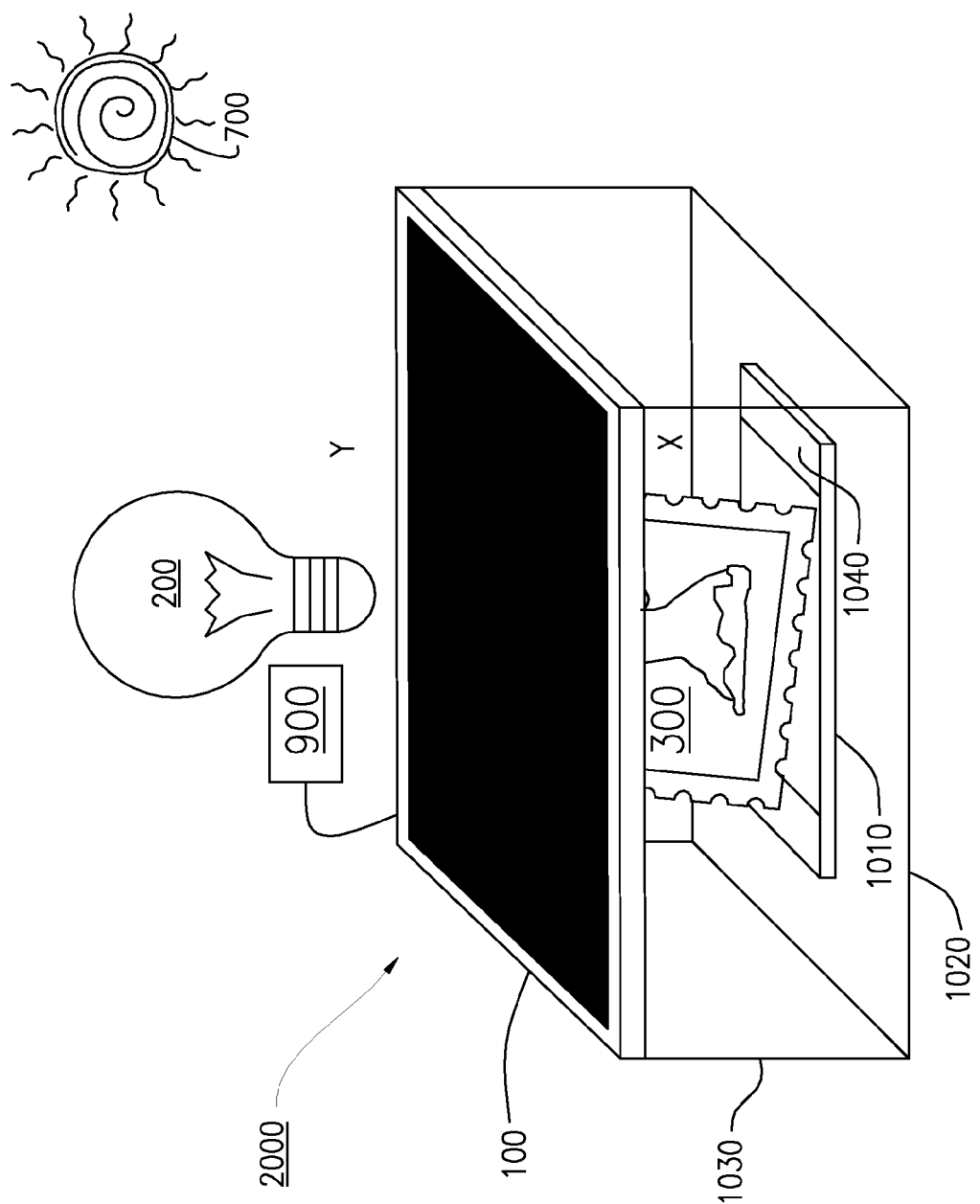
FIG. 3 is a representation of a display case.

Referring now to FIG. 3, and other Figures as needed, there is seen a representation of a display case. In FIG. 3 display element 900 is represented to comprise a transparency that is in a substantially darkened state. In an exemplary embodiment, a display element 900, voltage source 400 (not shown), and one or more circuits 800 (not shown) are packaged within and/or coupled to comprise a display frame 1000, which can, as desired, be used in a home, office, museum, exhibition hall or some other interior space 600. In an exemplary embodiment, display frame 1000 is used to selectively shield, or make viewable, a paper or paper like article 300, for example: a book, a letter, a document, an art item, an item of history, and the like.

In one embodiment, article 300 is coupled to and/or supported by display element 900 and/or a display frame 1000. In one embodiment, support of an article 300 to a display frame is functionally facilitated by a fastener, glue, an adhesive, or other coupler known to those skilled in the fastener arts. In the preferred embodiment, article 300 is placed on, coupled to, and/or supported by a support 1010. In embodiments, the support 1010 comprises, a plastic or plastic like material, a glass or glass like material, a paper or paper like material, or other material as known to those skilled in the support arts. In embodiments, support 1010 may comprise: a substantially inert plastic, a substantially non-acidic paper, or other material that would be expected to minimally interact with a particular article 300.

In a preferred embodiment, the display element 900 and/or a display frame 1000 is used to selectively make an article 300 available for viewing under, and at other times to selectively protect the article from the effects of, an artificial indoor source of light 200. In one embodiment, the display element 900 and/or a display frame 1000 is used as needed by direct or indirect placement over, or in front, of an article 300 that is desired to be selectively protected and/or viewed. In one embodiment, a display element 900 and/or a display frame 1000 may be mounted, coupled, or attached over, or attached to a viewing window of a prior art display case (not shown). In one embodiment, a display element 900 and/or a display frame 1000 are operatively and/or functionally coupled to a support 1010, the combination of which can be used to selectively display, exhibit, and at the same time protect an article 300 subject to the illumination of an artificial light source 200.

In one embodiment, a display element 900 and/or a display frame 1000 comprises at least one side of a display case 2000. In one embodiment, a display case 2000 comprises a display element 900, and/or a display frame 1000, and one or more side portions (sidewall) 1030, and/or one or more back portion (end wall) 1020. In one embodiment, one or more of side portions 1030 are darkened. In one embodiment, one or more side portions 1030 and/or one or more back portion 1020 also comprise a display element 900. In one embodiment, the display case 2000 is sized appropriately to allow an article 300 to be fully viewed. In one embodiment, a display case 2000 comprises an interior that may be hermetically sealed from the exterior. In one embodiment, an interior of a display case 2000 is filled with an inert gas, for example, nitrogen, argon, or the like. In one embodiment, a temperature and/or humidity within a display case 2000 is controllably maintained. In one embodiment, an interior of a display case 2000 is controllably refrigerated. In one embodiment, a display element 900 and/or a display frame 1000 alone, or in combination with a display case 2000, are moveable for mounting on a wall, or a floor, or other position with an interior of a building, etc. In one embodiment, a display case 2000 comprises a form factor that allows it to be easily moved or held, as for example, in a viewers or users hand. In one embodiment, a display case 2000 comprises the dimensions of prior art "slabs" (not shown) as are used by Professional Stamp Experts (PSE) PO BOX 6170, Newport Beach, Calif. 92658 to encapsulate graded philatelic items. In an exemplary embodiment, a display case 2000 with "slab like" dimensions comprises about 2.4 inches×3.5 inches×0.2 inches. Unlike prior art display cases, a display case 2000 can, thus, provide protection against the effects of visible light and at the same time be easily moved, even to the point of fitting and movement within a hand. Furthermore, unlike the prior art, an article 300 held within a display case 2000 can easily be protected from light during periods of movement not only indoors, but outdoors as well, during which time if a transparency of display element 900 is maintained in a substantially darkened state, the article 300 can be protected from the effects of natural light 700 as well.

In an exemplary embodiment, a support 1010 is positioned so as to maintain an article 300 against a surface of the display element 900, for example, so that an article may be substantially held in place or supported between a surface of a support 1010 and a display element 900. In one embodiment, the support 1010 may be perforated or made to be breathable. In some embodiments, spacers or standoffs 1040 may be disposed or formed between and/or around a display material and/or a support 1010 to provide an article 300 with adequate ventilation and/or support.

In one embodiment, the support 1010 itself may comprise a display element 900, in which embodiment, a display case 2000 could, thus, protect and at the same time allow an article 300 to be selectively viewed from at least two sides of the display case, as is sometimes desired with articles such as historical documents, philatelic items, stamps, and the like.

Figure 4:
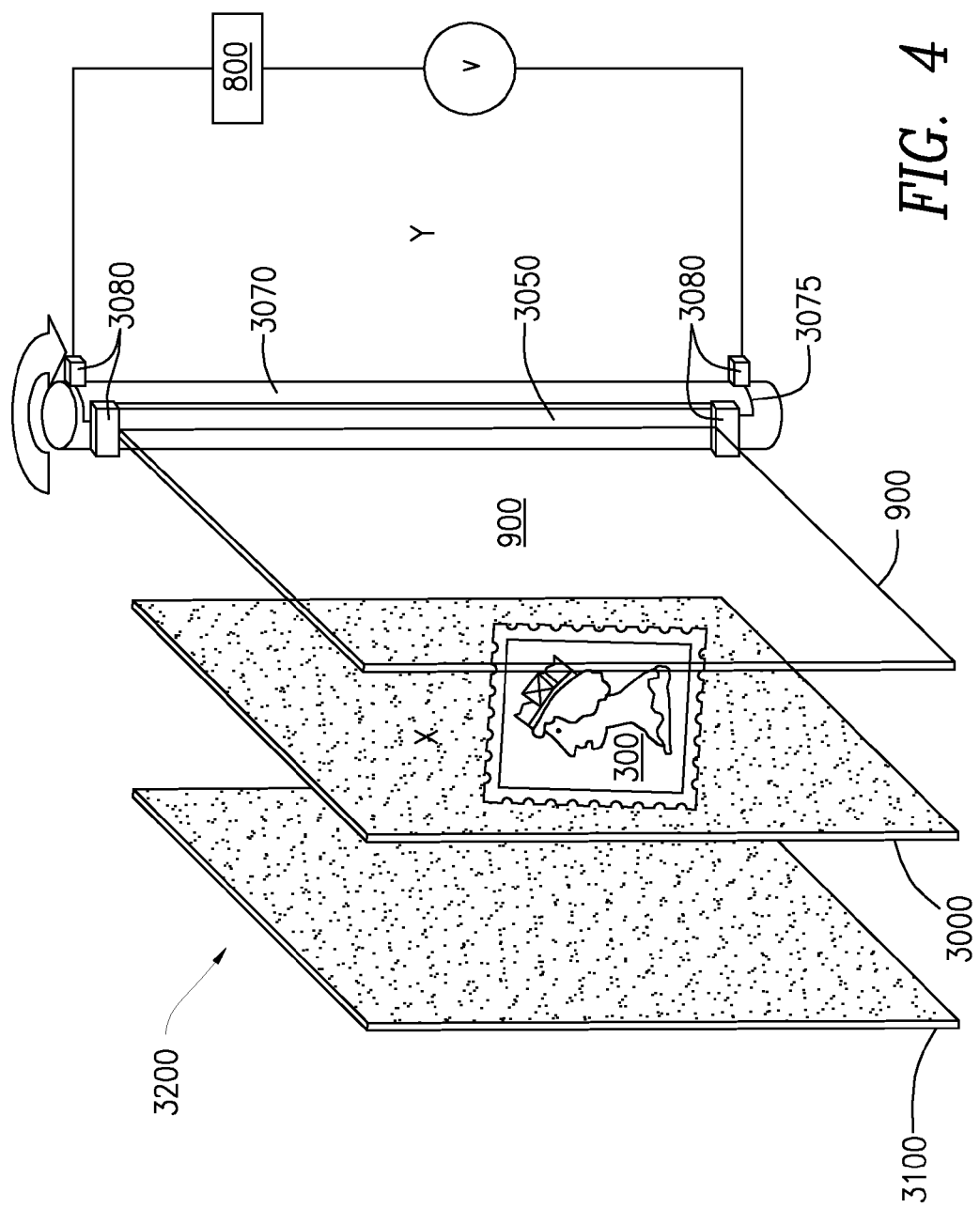
FIG. 4 is an exploded view of an exemplary apparatus.

Referring now to FIG. 4, and other Figures as needed, there is seen an exploded view of an exemplary apparatus. In one embodiment, a display element 900 is placed opposite or adjacent an article 300 and/or a page 3000. In embodiments, an article 300 and/or page 3000 is held against a display element 900 by one or more coupling fastener 3100, for example, adhesives, screws, de/attachable clips, clamps, magnets, other fasteners as could be implemented by those skilled in the fastener arts. In other embodiments, an article 300 and/or page 3000 is held against a display element 900 by a support and/or a second display material and/or a backing material 3100. In one embodiment, a display device 900, article 300 and/or page 3000, and fastener and/or backing material 3100 are coupled to one or more mechanism 3050 (hereafter referred to collectively as display page 3200). Although shown as being coupled to the display element 900, in other embodiments, the mechanism 3050 may be coupled to the fastener 3100, or both to the display material and the fastener and/or backing material 3100. In one embodiment, a fastener and/or backing material 3100 may itself provide the functionality of a mechanism 3050, in which case the mechanism 3050 might not necessarily need to be used. In an exemplary embodiment, a display page 3200 comprises one of a plurality of display pages. In one embodiment, a functionality of mechanism 3050 enables it to be coupled to a support mechanism 3070. In one embodiment, a functionality of support mechanism 3070 enables movement of one or more display page 3200 to be constrained, for example, as by one or more hinge (not shown), or other moveable constraint mechanism that could be implemented by those skilled in the art. In one embodiment, movement of display page 3200 is constrained by support mechanism 3070 in a direction indicated by the curved arrow.

In one embodiment, the one or more mechanism 3050 and/or the support mechanism 3070 include one or more connections 3080 that may be functionally coupled to enable a particular voltage V to be coupled to, or decoupled from, each display page 3200. In one embodiment, electrical coupling between electrical connections 3080 of each display page 3200 is enabled at one or more points of rotation of the display page about the support mechanism 3070, for example via appropriately disposed conductive traces 3075.

In the embodiment represented by FIG. 4, a display page 3200 is rotated to be in a viewing position, and via electrical connections 3080 application of voltage V is interrupted or applied to the display page 3200 to thereby change a transparency of display element 900 to a substantially clear state. In one embodiment (not shown), rotation of display page 3200 to a non-viewing position causes application of voltage V to be interrupted or to be applied to the display page 3200 to thereby change a transparency of display element 900 to a substantially darkened state. In this manner, as a display page 3200 is rotated, an article 300 and/or page 3000 can be made viewable, and subsequently when rotated out of view, protected from light and/or other effects of the environment. In one embodiment, one or more connections 3080 may be adapted to comprise slip fit electrical contacts that allow a display page 3200 to be decoupled and/or removed from mechanisms 3050 and/or 3070 quickly and easily.

Figure 5:
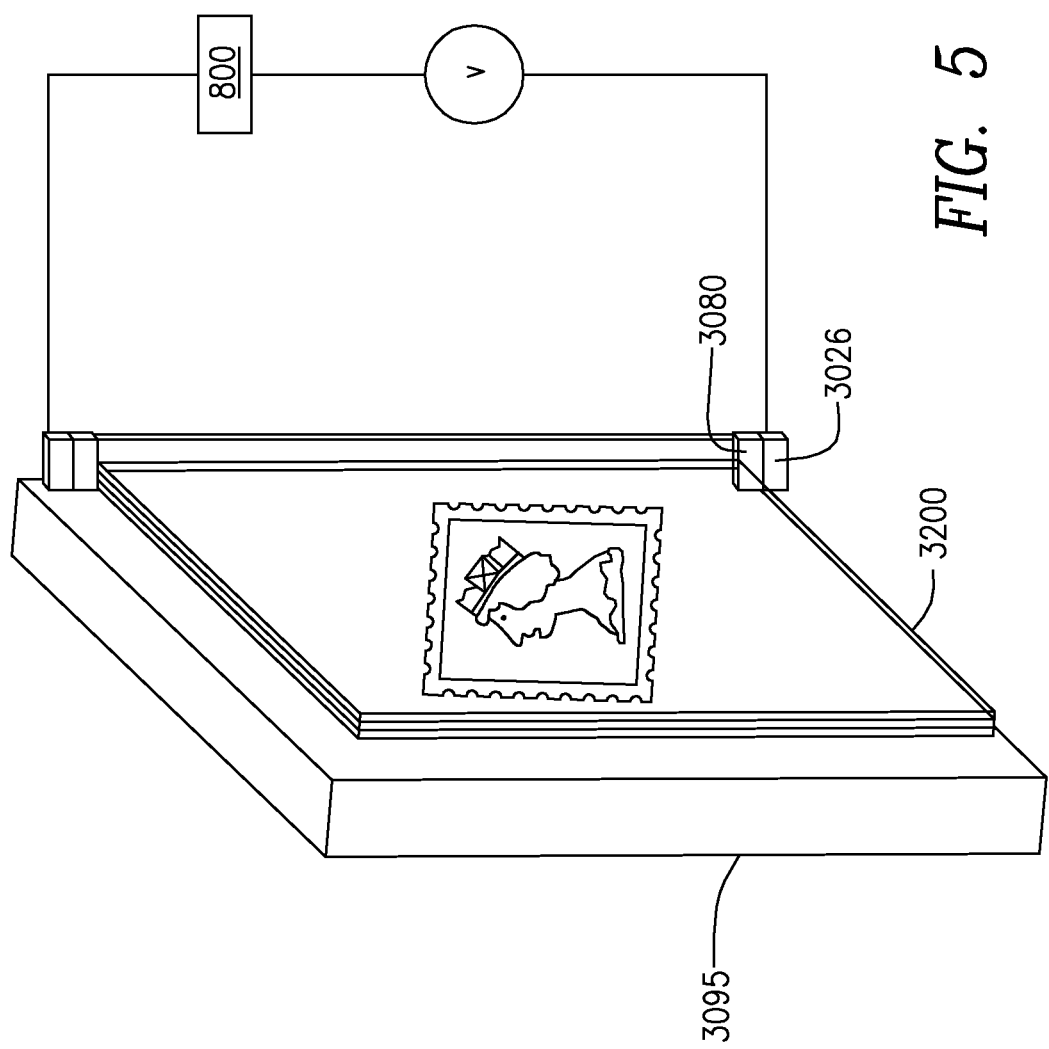
FIG. 5 is an exploded view of an exemplary apparatus.

Referring now to FIG. 5, and other Figures as needed, there is seen an exploded view of an exemplary apparatus. In embodiments, a display page 3200 is dimensioned to comprise a commonly sized form factor, for example, a standardized picture frame size, or dimensions of the aforementioned "slab." In one embodiment, a frame 3095 comprises one or more electrical slip fit contacts 3026 that functionally and operatively correspond to electrical connections 3080 of a display page 3200. In one embodiment, a display page 3200 is mountable within a frame 3095, which can thereafter be placed for viewing or exhibition on a wall, a table, etc. In one embodiment, a frame 3095 is adapted to provide voltage V to the display page 3200 through electrical connections 3080, such that articles 300 can, thus, either via manual or via automated control of the voltage V be made available for viewing and/or display (i.e. via a clear state of a display element 900) or, similarly, shielded from view and/or ambient light (i.e. via a darkened state of a display element 900).

In one embodiment, in an indoor setting where display element 900 is illuminated under artificial visible light 200 and natural visible light 700 as may be present through a window, a maximum amount of light does not exceed about 5000 lux of illumination, in which embodiment, with a selective change in transparency of display element 900 from a substantially transparent state to a substantially darkened state, an article 300 would be exposed to a differential of illumination that would not exceed about 5000 lux.

In a preferred embodiment, in an indoor setting where display element 900 is illuminated under artificial visible light 200 only, a maximum amount of light does not exceed about 1000 lux of illumination, in which embodiment, with a selective change in transparency of display element 900 from a substantially transparent state to a substantially darkened state, an article 300 would be exposed to a differential of illumination that would not exceed about 1000 lux.

Figure 6:
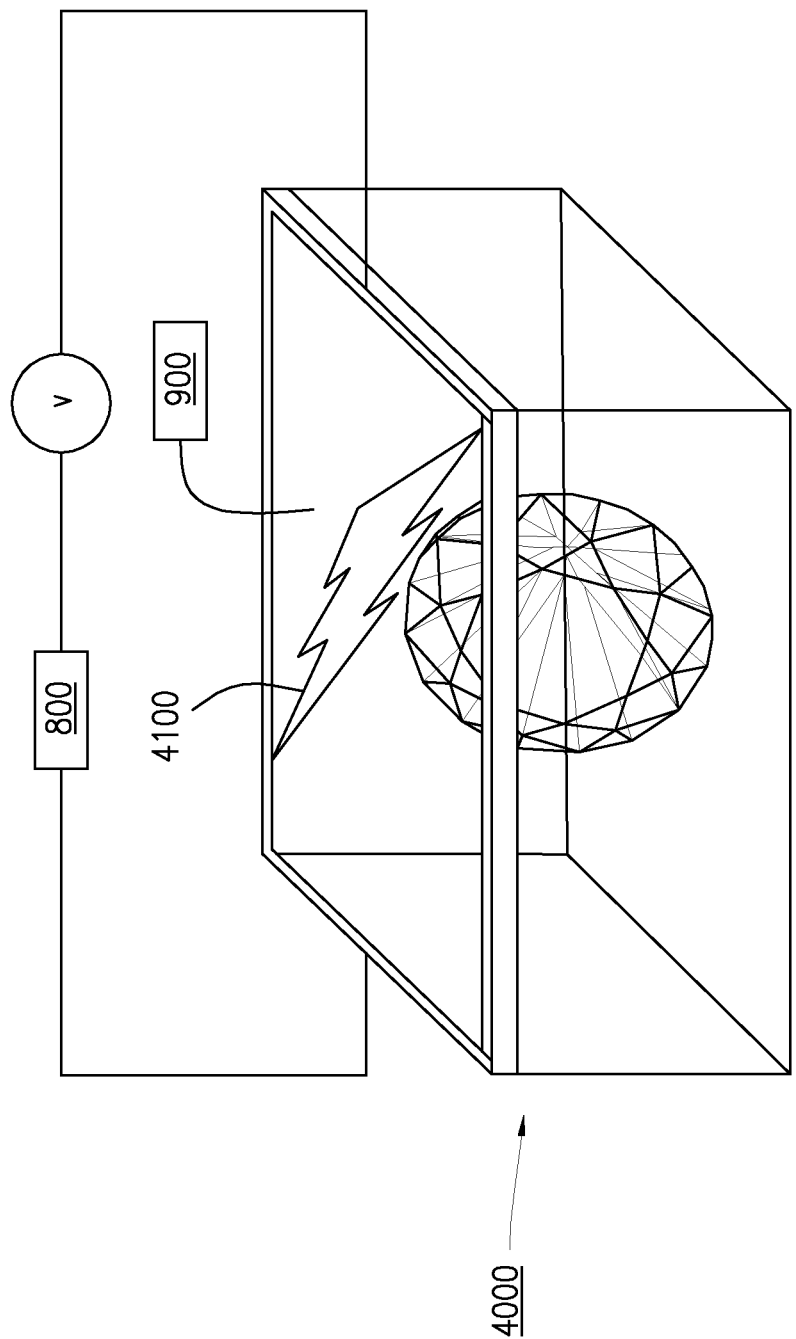
FIG. 6 is a representation of a failure mode of a display element.
Figure 7:
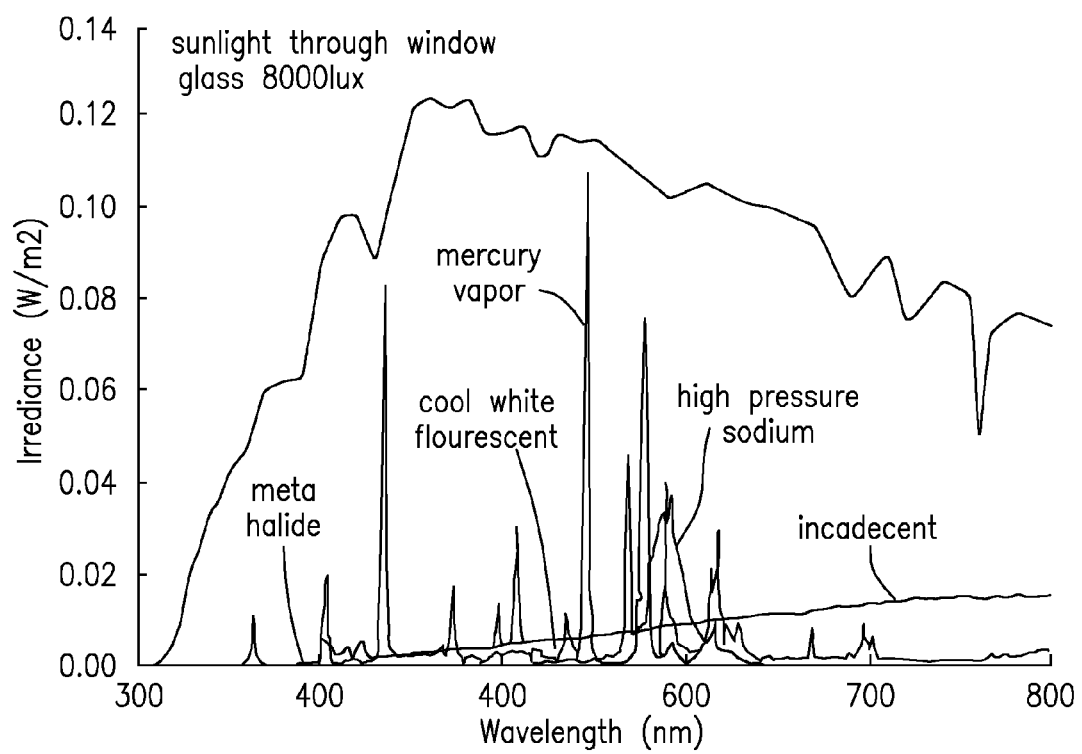
FIG. 7 is a chart showing the wavelengths and the amount of different types of interior and exterior light that potentially can be present within an interior of a windowed structure.

Referring now to FIG. 6, and other Figures as needed, there is seen a representation of a failure mode of a display material. In one embodiment, a display case 4000 may or may not be used to protect an article from the damaging effects of light, but is used to make an article 300 selectively visible or not visible. In one embodiment, an article 300 can be made selectively visible for viewing and, when needed, substantially invisible for security purposes. For example, with a display element 900 is in an opaque or darkened state, an article 300 can be shielded from the view of persons in its vicinity, whereas in a clear state the article can be made visible. In one embodiment, such visible or not visible functionality can be used in retail or museum environment, where during non-business or non-viewing hours an article 300 can be kept in a display case 4000 without persons in its vicinity knowing the article was present. In one embodiment, an article 300, which in the prior art may have been displayed during business hours in a storefront display case (not shown), and which would be removed from the display case for storage during non-business hours to prevent its theft, can now be kept in a display case 4000 continuously. In one embodiment, a display material may comprise a hardened and/or laminated shatterproof type of glass. Thus, because a display case 4000 can be selectively kept in a darkened state, an article 300 can be made more secure and less tempting to steal.

In one embodiment, it is identified that during application of voltage V, a small current flows through layers of display element 900. In one embodiment, failure of this current flow may be caused by cracking, breaking, smashing, degradation, or some other failure 4100 of the display element 900. In one embodiment, failure of the display element 900 is used to provide security or alarm functionality. In one embodiment, failure of the current flow is sensed by one or more circuit or circuit element 800, which in turn may be used to generate a signal or trigger an alarm. U.S. Pat. No. 7,800,812 describes a method for glass breakage detection in an architectural SPD window triggered by a drop in the current flow through the SPD. However, the present invention combines the protection of artwork form light, concealment of the artwork from would be thieves and breakage detection of the SPD glass as a complete artwork protection system.

In one embodiment, a display element (not shown) may be incorporated into the display element 100, 900. In an embodiment, the display element may be an alphanumeric display that is incorporated into the SPD material 120/121 and operable to provide information regarding the object 300 being displayed, for example. The display element may be incorporated elsewhere in the display element 100, 900 as desired.

In one embodiment, a wireless transceiver (transmitter/receiver) may be included to transmit and receive information for the operation of the display element 100 900. In one exemplary embodiment, a Wi-Fi connection may be established to provide operating commands remotely and/or to provide other data, including but not limited to data regarding the object being displayed. That is, the transparency of the display element 900 may be controlled remotely by Wi-Fi connection, if desired. Further, information about the object being displayed, and or the conditions surrounding it, may be transmitted to a remote administrator, for example, via a Wi-Fi connection. This allows for remote monitoring and control.

In an embodiment, an external sensor 2000 may be positioned in a room or other area in which a display device of a display case, or cases, including the display element 100, 900 is provided. The sensor 2000 is preferably configured to detect conditions within the room or area, including light levels, for example. Each of the display cases or display elements preferably includes a transceiver, as noted above. The sensor 2000 may also include a transceiver, or at least a transmitter to transmit information, such as control signals, to the one or more display devices or cases to control the transparency of the display element 100, 900. The dotted lines in FIG. 9 represent wireless communication between the sensor 2000 and the display elements 100, 900, however, a wired or wireless link may be provided as desired. In an embodiment, multiple cases, including the display element 100, 900 may be connected together to operate in accordance with conditions sensed by the sensor 2000. This connection may be a wired connection or a wireless connection, as desired. The sensor may be an acoustic sensor that detects speech to allow a user to provide voice instructions.

This document describes inventive embodiments that include apparatus or device and methods for shielding and protecting articles or objects from the effects in considerable detail. This was done for illustration purposes. Neither the specific embodiments of the invention as a whole, nor those of its features, limit the general principles underlying the invention. The specific features described herein may be used in some embodiments, but not in others, without departure from the spirit and scope of the invention as set forth. Many additional modifications are intended in the foregoing disclosure, and it will be appreciated by those of ordinary skill in the art that, in some instances, some features of the invention will be employed in the absence of a corresponding use of other features. The illustrative examples therefore do not define the metes and bounds of the invention and the legal protection afforded the invention, which should be limited only by the appended claims.

What is claimed is:

1. A display device for protecting objects from degradation by light comprising:
   a backing configured to receive an object to be displayed; and
   at least one display element including a suspended particle device (SPD) directly or indirectly connected to the backing and shielding the object to be displayed from an exterior of the display device, the SPD used in the display element configured such that a transparency of the display element to visible light is adjustable based a voltage applied to the display element.

2. The display device of claim 1, wherein the transparency of the display element changes in less than five seconds.

3. The display device of claim 2, wherein the SPD of the display element further comprises:
   a transparent outer layer;
   a first transparent electrode layer positioned adjacent to the transparent outer layer;
   a layer of SPD material positioned adjacent to the first transparent electrode layer;
   a second transparent electrode layer;
   a transparent inner layer adjacent to the second transparent electrode layer, wherein
   varying a voltage provided between the first transparent electrode and the second transparent electrode varies transmission of visible light through the SPD material; and
   a laminated layer, laminated onto at least one of the transparent outer layer and the transparent inner layer, the laminated layer including one of the group consisting of ultraviolet absorbing material or infrared reflecting material.

4. The display device of claim 3, further comprising a power supply connected to the first transparent electrode layer and the second transparent electrode layer and operable to provide an adjustable voltage between the first transparent electrode layer and the second transparent electrode layer.

5. The display device of claim 4, further comprising a sensor connected to the power supply and configured to provide a control signal to the power supply to control the adjustable voltage.

6. The display device of claim 5, wherein the sensor is a light sensor operable to determine a level of visible light at the outer surface of the display device.

7. The display device claim 5, wherein the sensor is a light sensor operable to determine a level of visible light inside the display device.

8. The display device of claim 5, wherein the sensor is a motion detector operable to detect a presence of an individual in the vicinity of the display device.

9. The display device of claim 5, wherein the sensor is configured to determine total cumulative exposure of the object to at least one of ultraviolet light, infrared light and visible light.

10. The light display device of claim 5, wherein the sensor is a temperature sensor operable to detect when a temperature exceeds a predetermined level.

11. The light display device of claim 5, wherein the sensor is an acoustic sensor operable to detect voice commands.

12. The display device of claim 4, further comprising an input element connected to the power supply and configured to allow a user to enter control information to control the adjustable voltage.

13. The display device of claim 4, further comprising a transceiver configured to send and receive information, the transceiver connected to the power supply and operable to receive control information to control the adjustable voltage provided by the power supply.

14. The display device of claim 13, further comprising at least one sensor operable to provide information regarding the display device, the sensor connected to the transceiver such that the transceiver transmits information regarding the display device.

15. The display device of claim 13, further comprising an external sensor positioned an area surrounding the display device and operable to detect conditions in the area surrounding the display device, the external sensor including a second transceiver operable to transmit the control information to the display device and at least one second display device positioned in the area surrounding the display device.

16. A method of protecting an object from degradation by light comprising:
   placing the object in the display case of claim 15; and
   permitting the object to be viewed within the display case.

17. The display device of claim 4, wherein the display element further comprises a display, configured to display information regarding the object to be displayed.

18. The display device of claim 4, wherein the power supply is a battery.

19. A method of protecting an object from degradation by light comprising:
   placing the object in a display device according to claim 1; and
   permitting the object to be observed within the display device.

20. A display case for protecting an object from degradation by light comprising:
   a bottom;
   a pair of opposing sidewalls extending upward from the bottom;
   a pair of opposing end walls extending upward from the bottom; and
   a display surface including a suspended particle device (SPD) positioned on top of the pair of opposing sidewalls and the pair of opposing end walls such that an object to be displayed is positioned on the bottom, under the display element and between the opposing sidewalls and the opposing end walls,
   at least the display element configured such that a transparency of the display element to visible light is adjustable based a voltage applied to the display element.

21. The display case of claim 20, wherein the transparency of the display element is adjustable in less than five seconds.

22. The display case of claim 21, wherein the SPD of the display element further comprises:
   a transparent outer layer;
   a first transparent electrode layer positioned adjacent to the transparent outer layer;
   a layer of SPD material positioned adjacent to the first transparent electrode layer;
   a second transparent electrode layer;
   a transparent inner layer adjacent to the second transparent electrode layer, wherein
   varying a voltage provided between the first transparent electrode and the second transparent electrode varies transmission of visible light through the SPD material and
   a laminated layer, laminated onto at least one of the transparent outer layer and the transparent inner layer, the laminated layer including one of the group consisting of ultraviolet absorbing material or infrared reflecting material.

23. The display case of claim 22, further comprising a power supply connected to the first transparent electrode layer and the second transparent electrode layer and operable to provide an adjustable voltage between the first transparent electrode layer and the second transparent electrode layer.

24. The display case of claim 23, further comprising a sensor connected to the power supply and configured to provide a control signal to the power supply to control the adjustable voltage.

25. The display case of claim 24, wherein the sensor is a light sensor operable to determine a level of visible light at an outer surface of the display case.

26. The display case claim 24, wherein the sensor is a light sensor operable to determine a level of visible light inside the display case.

27. The display case of claim 24, wherein the sensor is a motion detector operable to detect a presence of an individual in the vicinity of the display case.

28. The display case of claim 24, wherein the sensor is configured to determine total cumulative exposure of the object to ultraviolet light, infrared light and visible light.

29. The display case of claim 24, wherein the sensor is a temperature sensor operable to detect a temperature over a predetermined level.

30. The display case of claim 24, wherein the sensor is an acoustic sensor operable to detect voice commands of a user.

31. The display case of claim 23, further comprising an interior lighting system positioned inside the display case, wherein the interior lighting system is controlled based on the control signal of the sensor to provide a desired amount of light to the object.

32. The display case of claim 23, further comprising an input element connected to the power supply and configured to allow a user to enter control information to control the adjustable voltage.

33. The display case of claim 23, further comprising a transceiver configured to send and receive information, the transceiver connected to the power supply and operable to receive control information to control the adjustable voltage provided by the power supply.

34. The display case of claim 33, further comprising at least one sensor operable to provide information regarding the display case, the sensor connected to the transceiver such that the transceiver transmits information regarding the display case.

35. The display case of claim 34, further comprising an external sensor positioned in an area surrounding the display case and operable to detect conditions in the area surrounding the display case, the external sensor including a second transceiver operable to transmit the control information to the display case and at least one second display case positioned in the area surrounding the display case.

36. The display case of claim 23, wherein the display surface further comprises a display configured to display information regarding the object to be displayed.

\* \* \* \* \*